(12) United States Patent
Kim

(10) Patent No.: US 12,738,097 B2
(45) Date of Patent: Sep. 15, 2026

(54) ACTION RECOGNITION APPARATUS AND METHOD

(71) Applicants: HYUNDAI MOTOR COMPANY, Seoul (KR); Kia Corporation, Seoul (KR)

(72) Inventor: Sohee Kim, Suwon-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 293 days.

(21) Appl. No.: 18/673,645

(22) Filed: May 24, 2024

(65) Prior Publication Data

US 2025/0201022 A1 Jun. 19, 2025

(30) Foreign Application Priority Data

Dec. 14, 2023 (KR) ........................ 10-2023-0181759

(51) Int. Cl.
*G06K 9/00* (2022.01)
*G06T 7/73* (2017.01)
*G06V 40/20* (2022.01)

(52) U.S. Cl.
CPC ................ *G06V 40/20* (2022.01); *G06T 7/73* (2017.01); *G06T 2207/20044* (2013.01); *G06T 2207/20084* (2013.01)

(58) Field of Classification Search
USPC ....... 382/100, 103, 106–107, 156, 181, 199, 382/219, 254, 291, 305, 312; 600/408;
(Continued)

(56) References Cited

U.S. PATENT DOCUMENTS 8,953,844 B2 * 2/2015 Williams ............. G06V 40/103 348/46
2020/0401793 A1 * 12/2020 Leung .................. G06V 10/147
(Continued)

FOREIGN PATENT DOCUMENTS

JP 6972434 B1 11/2021
KR 10-2338486 B1 12/2021
(Continued)

OTHER PUBLICATIONS

Junwoo Lee et al., "Real-Time Human Action Recognition with a Low-Cost RGB Camera and Mobile Robot Platform", Sensors 2020, 20, 2886, pp. 1-12.
(Continued)

*Primary Examiner* — Seyed H Azarian
(74) *Attorney, Agent, or Firm* — MORGAN, LEWIS & BOCKIUS LLP

(57) ABSTRACT

An action recognition method of an action recognition apparatus operated by a processor includes, receiving a video image; detecting position values and joint prediction values of each of a plurality of joints for each of the plurality of image frames constituting the video image; calculating a position difference of each of the plurality of joints for each of the plurality of image frames; generating input data including a position value, a predicted value, and a position difference of each of the plurality of joints for each of the plurality of image frames; and detecting a type of action by inputting the input data into an action recognition model.

17 Claims, 21 Drawing Sheets

(58) Field of Classification Search
USPC .......................................................... 348/46
See application file for complete search history.

(56) References Cited

U.S. PATENT DOCUMENTS

| | | | | |
|---|---|---|---|---|
| 2022/0108468 | A1* | 4/2022 | Nakamura | G06T 7/73 |
| 2023/0196841 | A1* | 6/2023 | Min | G06V 10/22<br>382/103 |
| 2023/0248261 | A1* | 8/2023 | Mun | G06T 7/215<br>600/408 |
| 2024/0303859 | A1* | 9/2024 | Nakamura | G06T 7/251 |
| 2025/0355419 | A1* | 11/2025 | Hori | B25J 13/003 |

FOREIGN PATENT DOCUMENTS

| | | | |
|---|---|---|---|
| KR | 10-2022-0142673 | A | 10/2022 |
| WO | 2022-024294 | A1 | 2/2022 |

OTHER PUBLICATIONS

Ethan Perez et al., "FiLM: Visual Reasoning with a General Conditioning Layer", The Thirty-Second AAAI Conference on Artificial Intelligence (AAAI-18), pp. 3942-3951.

Zhe Cao et al., "OpenPose: Realtime Multi-Person 2D Pose Estimation using Part Affinity Fields", IEEE Transactions on Pattern Analysis and Machine Intelligence, 2017, pp. 1-14.

Hao-Shu Fang et al., "AlphaPose: Whole-Body Regional Multi-Person Pose Estimation and Tracking in Real-Time", IEEE Transactions on Pattern Analysis and Machine Intelligence, 2022, pp. 1-17.

Jingdong Wang et al., "Deep High-Resolution Representation Learning for Visual Recognition", IEEE Transactions on Pattern Analysis and Machine Intelligence, 2020, pp. 1-23.

Kaiming He et al., "Deep Residual Learning for Image Recognition", Proceedings of the IEEE Conference on Computer Vision and Pattern Recognition (CVPR), 2016, pp. 770-778.

Karen Simonyan et al., "Very Deep Convolutional Networks for Large-Scale Image Recognition", Published as a conference paper at ICLR 2015, pp. 1-14.

* cited by examiner

Figure 3:
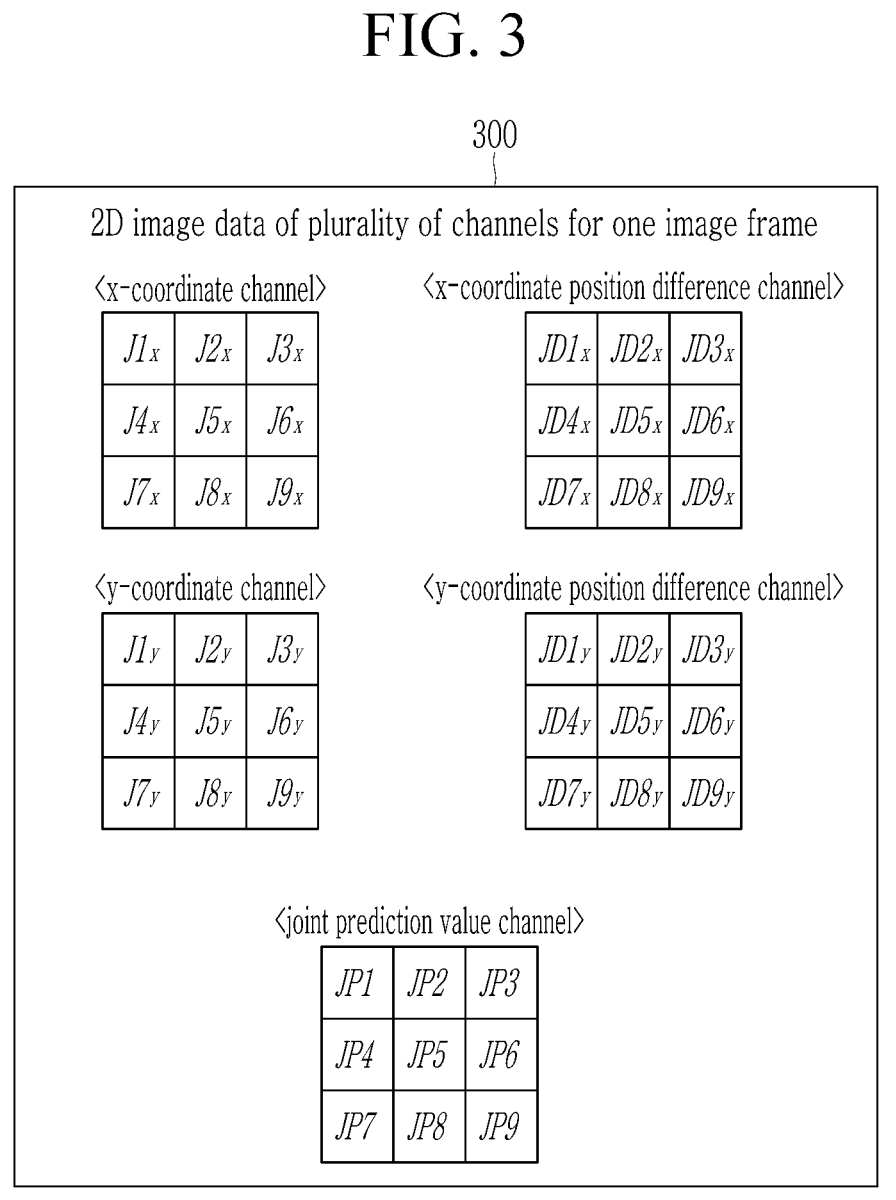

2D image data of plurality of channels for one image frame

⟨x-coordinate channel⟩

| | | |
|---|---|---|
| $J1_x$ | $J2_x$ | $J3_x$ |
| $J4_x$ | $J5_x$ | $J6_x$ |
| $J7_x$ | $J8_x$ | $J9_x$ |

⟨x-coordinate position difference channel⟩

| | | |
|---|---|---|
| $JD1_x$ | $JD2_x$ | $JD3_x$ |
| $JD4_x$ | $JD5_x$ | $JD6_x$ |
| $JD7_x$ | $JD8_x$ | $JD9_x$ |

⟨y-coordinate channel⟩

| | | |
|---|---|---|
| $J1_y$ | $J2_y$ | $J3_y$ |
| $J4_y$ | $J5_y$ | $J6_y$ |
| $J7_y$ | $J8_y$ | $J9_y$ |

⟨y-coordinate position difference channel⟩

| | | |
|---|---|---|
| $JD1_y$ | $JD2_y$ | $JD3_y$ |
| $JD4_y$ | $JD5_y$ | $JD6_y$ |
| $JD7_y$ | $JD8_y$ | $JD9_y$ |

⟨joint prediction value channel⟩

| | | |
|---|---|---|
| JP1 | JP2 | JP3 |
| JP4 | JP5 | JP6 |
| JP7 | JP8 | JP9 |

Figure 4:
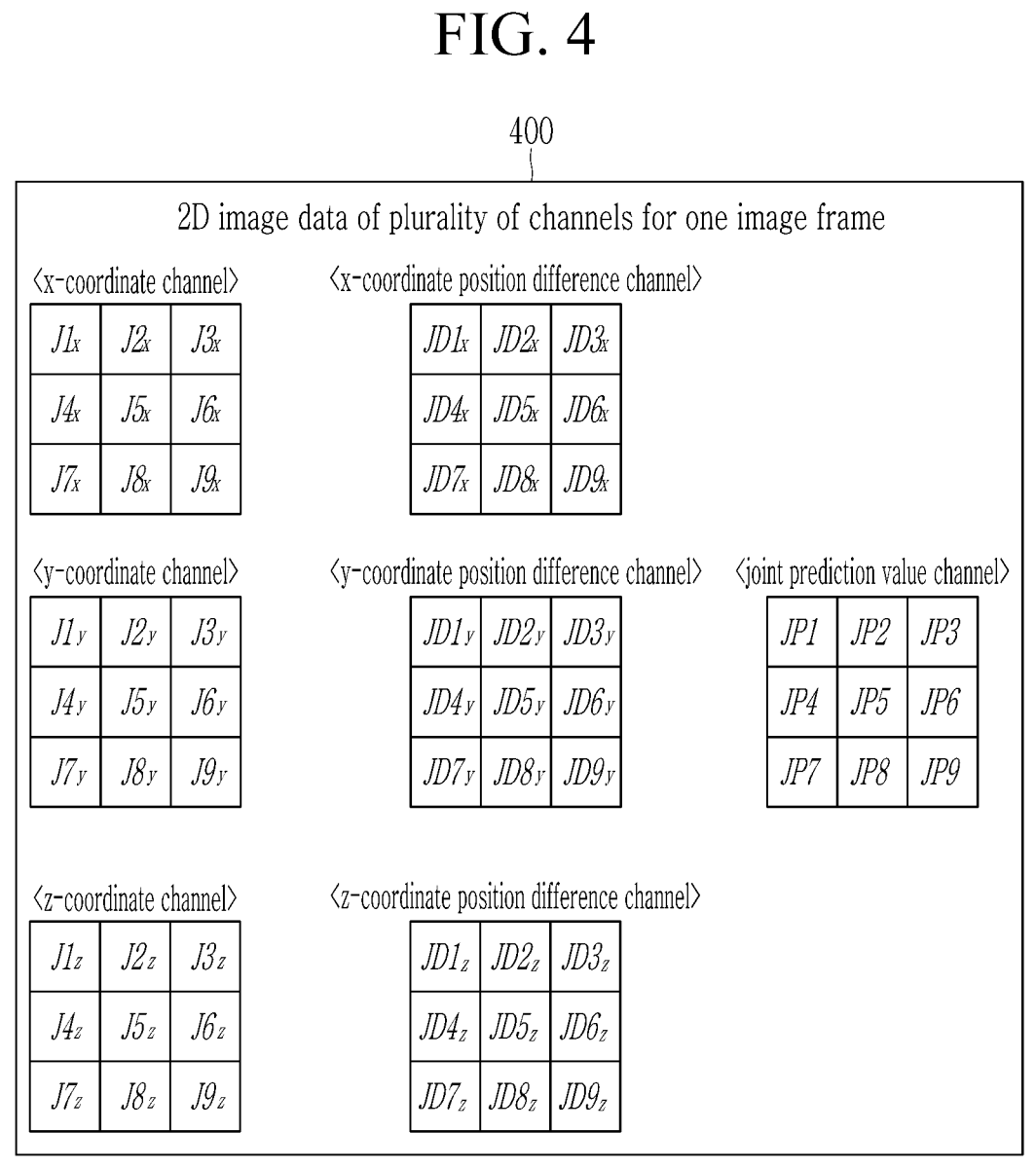

2D image data of plurality of channels for one image frame

<x-coordinate channel>

| | | |
|---|---|---|
| $J1_x$ | $J2_x$ | $J3_x$ |
| $J4_x$ | $J5_x$ | $J6_x$ |
| $J7_x$ | $J8_x$ | $J9_x$ |

<x-coordinate position difference channel>

| | | |
|---|---|---|
| $JD1_x$ | $JD2_x$ | $JD3_x$ |
| $JD4_x$ | $JD5_x$ | $JD6_x$ |
| $JD7_x$ | $JD8_x$ | $JD9_x$ |

<y-coordinate channel>

| | | |
|---|---|---|
| $J1_y$ | $J2_y$ | $J3_y$ |
| $J4_y$ | $J5_y$ | $J6_y$ |
| $J7_y$ | $J8_y$ | $J9_y$ |

<y-coordinate position difference channel>

| | | |
|---|---|---|
| $JD1_y$ | $JD2_y$ | $JD3_y$ |
| $JD4_y$ | $JD5_y$ | $JD6_y$ |
| $JD7_y$ | $JD8_y$ | $JD9_y$ |

<joint prediction value channel>

| | | |
|---|---|---|
| JP1 | JP2 | JP3 |
| JP4 | JP5 | JP6 |
| JP7 | JP8 | JP9 |

<z-coordinate channel>

| | | |
|---|---|---|
| $J1_z$ | $J2_z$ | $J3_z$ |
| $J4_z$ | $J5_z$ | $J6_z$ |
| $J7_z$ | $J8_z$ | $J9_z$ |

<z-coordinate position difference channel>

| | | |
|---|---|---|
| $JD1_z$ | $JD2_z$ | $JD3_z$ |
| $JD4_z$ | $JD5_z$ | $JD6_z$ |
| $JD7_z$ | $JD8_z$ | $JD9_z$ |

| $T1,J1_x$ | $T1,J2_x$ | ··· | ··· | $T1,Jn_x$ |
|---|---|---|---|---|
| $T2,J1_x$ | $T2,J2_x$ | ··· | ··· | $T2,Jn_x$ |
| ··· | | | | ··· |
| ··· | | | | ··· |
| $Tt,J1_x$ | $Tt,J2_x$ | ··· | ··· | $Tt,Jn_x$ |

| | | | | |
|---|---|---|---|---|
| $T1,JD1_X$ | $T1,JD2_X$ | … | … | $T1,JDn_X$ |
| $T2,JD1_X$ | $T2,JD2_X$ | … | … | $T2,JDn_X$ |
| … | | | | … |
| … | | | | … |
| $Tt,JD1_X$ | $Tt,JD2_X$ | … | … | $Tt,JDn_X$ |

| $T1,J1_X$ | $T1,J2_X$ | … | … | $T1,Jk_X$ |
|---|---|---|---|---|
| $T2,J1_X$ | … | … | … | $T1,Jn_X$ |
| … | | | | … |
| $Tt,J1_X$ | $Tt,J2_X$ | … | … | $Tt,Jk_X$ |
| $Tt,J1_X$ | … | … | … | $Tt,Jn_X$ |

Figure 9:
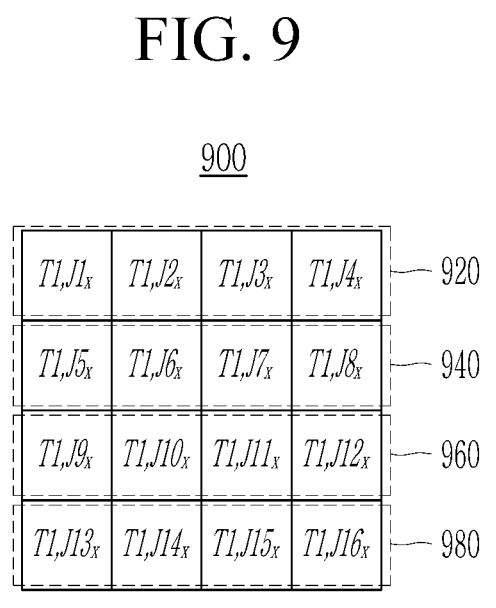

| | | | | |
|---|---|---|---|---|
| $T1,J1_X$ | $T1,J2_X$ | $T1,J3_X$ | $T1,J4_X$ | 920 |
| $T1,J5_X$ | $T1,J6_X$ | $T1,J7_X$ | $T1,J8_X$ | 940 |
| $T1,J9_X$ | $T1,J10_X$ | $T1,J11_X$ | $T1,J12_X$ | 960 |
| $T1,J13_X$ | $T1,J14_X$ | $T1,J15_X$ | $T1,J16_X$ | 980 |

| | | | | | | | |
|---|---|---|---|---|---|---|---|
| $T1,JD1_x$ | $T1,JD2_x$ | $T1,JD3_x$ | $T1,JD4_x$ | $T2,JD1_x$ | $T2,JD2_x$ | $T2,JD3_x$ | $T2,JD4_x$ |
| $T1,JD5_x$ | $T1,JD6_x$ | $T1,JD7_x$ | $T1,JD8_x$ | $T2,JD5_x$ | $T2,JD6_x$ | $T2,JD7_x$ | $T2,JD8_x$ |
| $T1,JD9_x$ | $T1,JD10_x$ | $T1,JD11_x$ | $T1,JD12_x$ | $T2,JD9_x$ | $T2,JD10_x$ | $T2,JD11_x$ | $T2,JD12_x$ |
| $T1,JD13_x$ | $T1,JD14_x$ | $T1,JD15_x$ | $T1,JD16_x$ | $T2,JD13_x$ | $T2,JD14_x$ | $T2,JD15_x$ | $T2,JD16_x$ |
| $T5,JD1_x$ | $T5,JD2_x$ | $T5,JD3_x$ | $T5,JD4_x$ | $T6,JD1_x$ | $T6,JD2_x$ | $T6,JD3_x$ | $T6,JD4_x$ |
| $T5,JD5_x$ | $T5,JD6_x$ | $T5,JD7_x$ | $T5,JD8_x$ | $T6,JD5_x$ | $T6,JD6_x$ | $T6,JD7_x$ | $T6,JD8_x$ |
| $T5,JD9_x$ | $T5,JD10_x$ | $T5,JD11_x$ | $T5,JD12_x$ | $T6,JD9_x$ | $T6,JD10_x$ | $T6,JD11_x$ | $T6,JD12_x$ |
| $T5,JD13_x$ | $T5,JD14_x$ | $T5,JD15_x$ | $T5,JD16_x$ | $T2,JD13_x$ | $T6,JD14_x$ | $T6,JD15_x$ | $T6,JD16_x$ |

…

| | | | |
|---|---|---|---|
| $T4,JD1_x$ | $T4,JD2_x$ | $T4,JD3_x$ | $T4,JD4_x$ |
| $T4,JD5_x$ | $T4,JD6_x$ | $T4,JD7_x$ | $T4,JD8_x$ |
| $T4,JD9_x$ | $T4,JD10_x$ | $T4,JD11_x$ | $T4,JD12_x$ |
| $T4,JD13_x$ | $T4,JD14_x$ | $T4,JD15_x$ | $T4,JD16_x$ |
| $T8,JD1_x$ | $T8,JD2_x$ | $T8,JD3_x$ | $T8,JD4_x$ |
| $T8,JD5_x$ | $T8,JD6_x$ | $T8,JD7_x$ | $T8,JD8_x$ |
| $T8,JD9_x$ | $T8,JD10_x$ | $T8,JD11_x$ | $T8,JD12_x$ |
| $T8,JD13_x$ | $T8,JD14_x$ | $T8,JD15_x$ | $T8,JD16_x$ |

⋮

| | | | | | | | |
|---|---|---|---|---|---|---|---|
| $T13,JD1_x$ | $T13,JD2_x$ | $T13,JD3_x$ | $T13,JD4_x$ | $T14,JD1_x$ | $T14,JD2_x$ | $T14,JD3_x$ | $T14,JD4_x$ |
| $T13,JD5_x$ | $T13,JD6_x$ | $T13,JD7_x$ | $T13,JD8_x$ | $T14,JD5_x$ | $T14,JD6_x$ | $T14,JD7_x$ | $T14,JD8_x$ |
| $T13,JD9_x$ | $T13,JD10_x$ | $T13,JD11_x$ | $T13,JD12_x$ | $T14,JD9_x$ | $T14,JD10_x$ | $T14,JD11_x$ | $T14,JD12_x$ |
| $T13,JD13_x$ | $T13,JD14_x$ | $T13,JD15_x$ | $T13,JD16_x$ | $T14,JD13_x$ | $T14,JD14_x$ | $T14,JD15_x$ | $T14,JD16_x$ |

…

| | | | |
|---|---|---|---|
| $T16,JD1_x$ | $T16,JD2_x$ | $T16,JD3_x$ | $T16,JD4_x$ |
| $T16,JD5_x$ | $T16,JD6_x$ | $T16,JD7_x$ | $T16,JD8_x$ |
| $T16,JD9_x$ | $T16,JD10_x$ | $T16,JD11_x$ | $T16,JD12_x$ |
| $T16,JD13_x$ | $T16,JD14_x$ | $T16,JD15_x$ | $T16,JD16_x$ |

| $T1,JD1_x$ | $T2,JD1_x$ | ··· | ··· | $Tt,JDn_x$ | $T1,JD1_y$ | $T2,JD1_y$ | ··· | ··· | $Tt,JDn_y$ |
|---|---|---|---|---|---|---|---|---|---|

| $T1,JD1_x$ | $T2,JD1_x$ | ... | ... | $T1,JDn_x$ | $T1,JD1_y$ | $T2,JD1_y$ | ... | ... | $Tt,JDn_y$ | $T1,JD1_z$ | $T2,JD1_z$ | ... | ... | $Tt,JDn_z$ |
|---|---|---|---|---|---|---|---|---|---|---|---|---|---|---|

| $T1,JD1_x$ | $T2,JD1_x$ | ··· | ··· | $Tt,JDn_x$ |
|---|---|---|---|---|
| $T1,JD1_y$ | $T2,JD1_y$ | ··· | ··· | $Tt,JDn_y$ |

| | | | | |
|---|---|---|---|---|
| $T1,JD1_x$ | $T2,JD1_x$ | ⋯ | ⋯ | $Tt,JDn_x$ |
| $T1,JD1_y$ | $T2,JD1_y$ | ⋯ | ⋯ | $Tt,JDn_y$ |
| $T1,JD1_z$ | $T2,JD1_z$ | ⋯ | ⋯ | $Tt,JDn_z$ |

Figure 21:
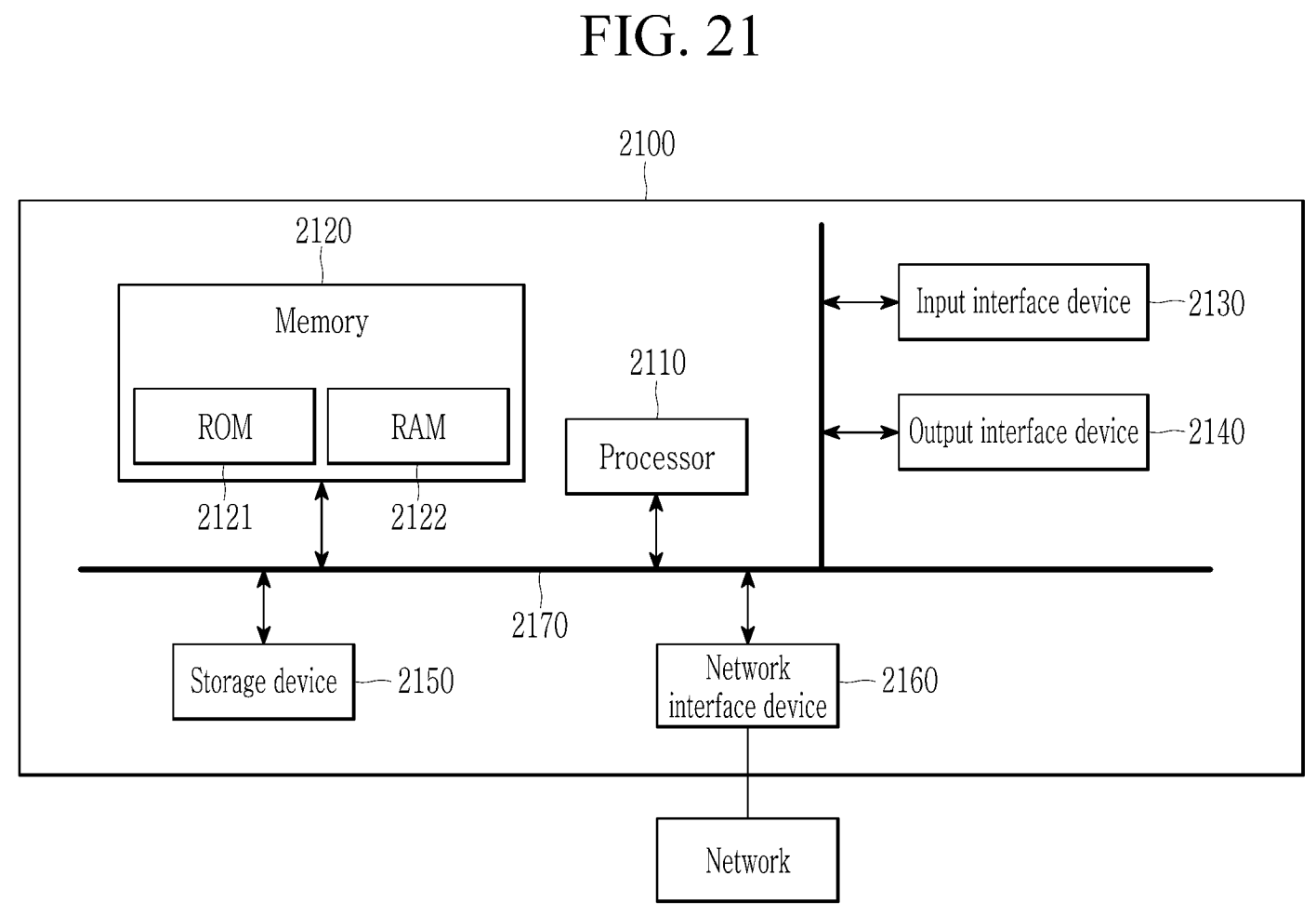

2130 Input interface device

2140 Output interface device

2110 Processor

2120 Memory

2121 ROM

2122 RAM

2170

2160 Network interface device

Network

2150 Storage device

ACTION RECOGNITION APPARATUS AND METHOD

CROSS-REFERENCE TO RELATED APPLICATION

This application claims priority to and the benefit of Korean Patent Application No. 10-2023-0181759 filed in the Korean Intellectual Property Office on Dec. 14, 2023, the entire contents of which are incorporated herein by reference.

BACKGROUND

(a) Technical Field

This disclosure relates to an action recognition apparatus and method.

(b) Description of the Related Art

For active service by robots, human-robot interaction (HRI) is necessary, and technology that recognizes human action is a key element for this.

In action recognition for robot control and communication with robots, interactions with other objects rarely occur, so understanding the human action itself may be computationally more efficient than understanding the entire video screen.

In addition, joint position information of the human and joint prediction values may be provided as important clues for recognizing human actions, and joint position changes along the time axis are the most important factors for accurate behavior recognition.

A deep learning-based action recognition system extracts joint location information from images and recognizes actions based on the joint location information. The deep learning network learns joint position changes, however it is not clear whether the deep learning network uses joint position changes when recognizing actions.

SUMMARY

The present disclosure is to provide an action recognition apparatus and method capable of more accurately recognizing actions by explicitly using changes in joint positions.

According to one embodiment, an action recognition method may be provided. The action recognition method includes, receiving, by an action recognition apparatus operated by a processor, a video image; detecting, by a data obtainer, both a position value and joint prediction value of each joint among a plurality of joints for each image frame among a plurality of image frames constituting the video image; calculating, by an input data generator, a position difference of the each joint for the each image frame; generating, by the input data generator, input data including the position value, the joint prediction predicted value, and the position difference of the each joint for the each image frame; and detecting, by an action predictor including an action recognition model, a type of action by inputting the input data into the action recognition model.

The input data may include two-dimensional (2D) image data of a first channel including the position value of the each joint for the plurality of image frames; 2D image data of a second channel including the position difference of the each joint for the plurality of image frames; and 2D image data of a third channel including the joint prediction value of the each joint for the plurality of image frames.

The position value may include an x-coordinate and a y-coordinate, and the position difference may include an x-coordinate position difference and a y-coordinate position difference.

The 2D image data of the first channel may include 2D image data of an x-coordinate channel including an x-coordinate of the each joint for the plurality of image frames; and 2D image data of a y-coordinate channel including a y-coordinate of the each joint for the plurality of image frames, the 2D image data of the second channel may include 2D image data of a x-coordinate position difference channel including an x-coordinate position difference of the each joint for the plurality of image frames; and 2D image data of a y-coordinate position difference channel including a y-coordinate position difference of the each joint for the plurality of image frames.

The position value may include an x-coordinate, a y-coordinate, and a z-coordinate, and the position difference may include an x-coordinate position difference, a y-coordinate position difference, and a z-coordinate position difference.

The 2D image data of a first channel may include 2D image data of an x-coordinate channel including an x-coordinate of the each joint for the plurality of image frames; 2D image data of a y-coordinate channel including a y-coordinate of the each joint for the plurality of image frames; and 2D image data of a z-coordinate channel including a z-coordinate of the each joint for the plurality of image frames, the 2D image data of a second channel may include 2D image data of a x-coordinate position difference channel including an x-coordinate position difference of the each joint for the plurality of image frames; 2D image data of a y-coordinate position difference channel including a y-coordinate position difference of the each joint for the plurality of image frames; and 2D image data of a z-coordinate position difference channel including a z-coordinate position difference of the each joint for the plurality of image frames.

The action recognition model may be a convolutional neural network (CNN).

The input data may include a first input data including the position value and the joint prediction value of the each joint for the each image frame; and a second input data including the position difference of the each joint for the each image frame, the action recognition model may be a convolutional neural network (CNN) with an attention network applied, and the action recognition method further includes inputting, by the action recognition apparatus, the first input data to a first layer of the CNN, and inputting, by the action recognition apparatus, the second input data to the attention network.

The position value may include an x-coordinate and a y-coordinate, and the position difference may include an x-coordinate difference and a y-coordinate difference.

The first input data may include 2D image data of a first channel including an x-coordinate of the each joint for the plurality of image frames; 2D image data of a second channel including a y-coordinate of the each joint for the plurality of image frames; and 2D image data of a third channel including the joint prediction value of the each joint for the plurality of image frames, and the second input data may include 2D image data of a fourth channel including an x-coordinate position difference of the each joint for the plurality of image frames and a y-coordinate position difference of the each joint for the plurality of image frames.

The position value may include an x-coordinate, a y-coordinate, and a z-coordinate, and the position difference may include an x-coordinate position difference, a y-coordinate position difference, and a z-coordinate position difference.

The first input data may include 2D image data of a first channel including an x-coordinate of the each joint for the plurality of image frames; 2D image data of a second channel including a y-coordinate of the each joint for the plurality of image frames; 2D image data of a third channel including a z-coordinate of the each joint for the plurality of image frames; and 2D image data of a third channel including the joint prediction value of the each joint for the plurality of image frames, the second input data may include 2D image data of a fourth channel including an x-coordinate position difference of the each joint for the plurality of image frames, a y-coordinate position difference of the each joint for the plurality of image frames, and a z-coordinate position difference of the each joint for the plurality of image frames.

The action recognition method may further include learning the action recognition model by utilizing the position value, the joint prediction value, and the position difference of the each joint for the each image frame obtained from each of a plurality of learning video images along with a correct answer label as learning data.

According to another embodiment, an action recognition apparatus that recognizes actions from an input video image may be provided. The action recognition apparatus includes, a data obtainer configured to detect both a position value and a joint prediction value of each joint among a plurality of joints for each image frame among a plurality of image frames constituting the input video image; an input data generator configured to calculate a position difference of the each joint for the each image frame and generate an input data including the position value, the joint prediction value, and the position difference of the each joint for the each image frame; and an action predictor configured to include an action recognition model and recognize a type of action based on results output by inputting the input data into the action recognition model.

The position value may include an x-coordinate and a y-coordinate, and the position difference may include an x-coordinate difference and a y-coordinate difference, and the input data may include 2D image data of a first channel including an x-coordinate of each of the plurality of joints for the plurality of image frames; 2D image data of a second channel including a y-coordinate of the each joint for the plurality of image frames; 2D image data of a third channel including an x-coordinate position difference of the each joint for the plurality of image frames; 2D image data of a fourth channel including a y-coordinate position difference of the each joint for the plurality of image frames; and 2D image data of a fifth channel including the joint prediction value of the each joint for the plurality of image frames.

The position value may further include a z-coordinate, the position difference may further include a z-coordinate position difference, the input data may further include 2D image data of a sixth channel including a z-coordinate of the each joint for the plurality of image frames; and 2D image data of a seventh channel including a z-coordinate position difference of the each joint for the plurality of image frames.

The action recognition model may be a convolutional neural network (CNN).

The input data may include a first input data including the position value and the joint prediction value of the each joint for the each image frame; and a second input data including the position difference of the each joint for the each image frame, the action recognition model may be a convolutional neural network (CNN) with an attention network applied, the action recognition apparatus may be configured to input the first input data to a first layer of the CNN, and the action recognition apparatus may be configured to input the second input data to the attention network.

The position value may include an x-coordinate and a y-coordinate, the position difference may include an x-coordinate difference and a y-coordinate difference, the first input data may include 2D image data of a first channel including an x-coordinate of the each joint for the plurality of image frames; 2D image data of a second channel including a y-coordinate of the each joint for the plurality of image frames; and 2D image data of a third channel including the joint prediction value of the each joint for the plurality of image frames, the second input data may include 2D image data of a fourth channel including an x-coordinate position difference of the each joint for the plurality of image frames and a y-coordinate position difference of the each joint for the plurality of image frames.

The position value may further include a z-coordinate, the position difference may further include a z-coordinate position difference, the first input data may further include 2D image data of a fifth channel including a z-coordinate of the each joint for the plurality of image frames, and the 2D image data of the fourth channel may further include a z-coordinate position difference of the each joint for the plurality of image frames.

BRIEF DESCRIPTION OF THE DRAWINGS

FIG. 3 is a diagram showing part of input data according to one embodiment.

FIG. 4 is a diagram showing part of input data according to another embodiment.

FIG. 5 is a diagram showing an example of an x-coordinate channel for an entire image frame constituting a video image.

FIG. 6 is a diagram showing an example of an x-coordinate position difference channel for an entire image frame constituting a video image.

FIG. 7 is a diagram showing another example of the x-coordinate channel for the entire image frame constituting a video image.

FIG. 8 is a diagram showing another example of the x-coordinate position difference channel for the entire image frame constituting a video image.

FIG. 9 is a diagram showing another example of an x-coordinate channel for one image frame.

FIG. 10 is a diagram showing another example of an x-coordinate position difference channel for one image frame.

FIG. 11 is a diagram showing another example of the x-coordinate position difference channel for the entire image frame constituting a video image.

FIGS. 14 to 17 are diagrams showing an example of two-dimensional image data of a position difference channel.

FIG. 21 is a diagram showing an action recognition apparatus according to another embodiment.

DETAILED DESCRIPTION

Figure 1:
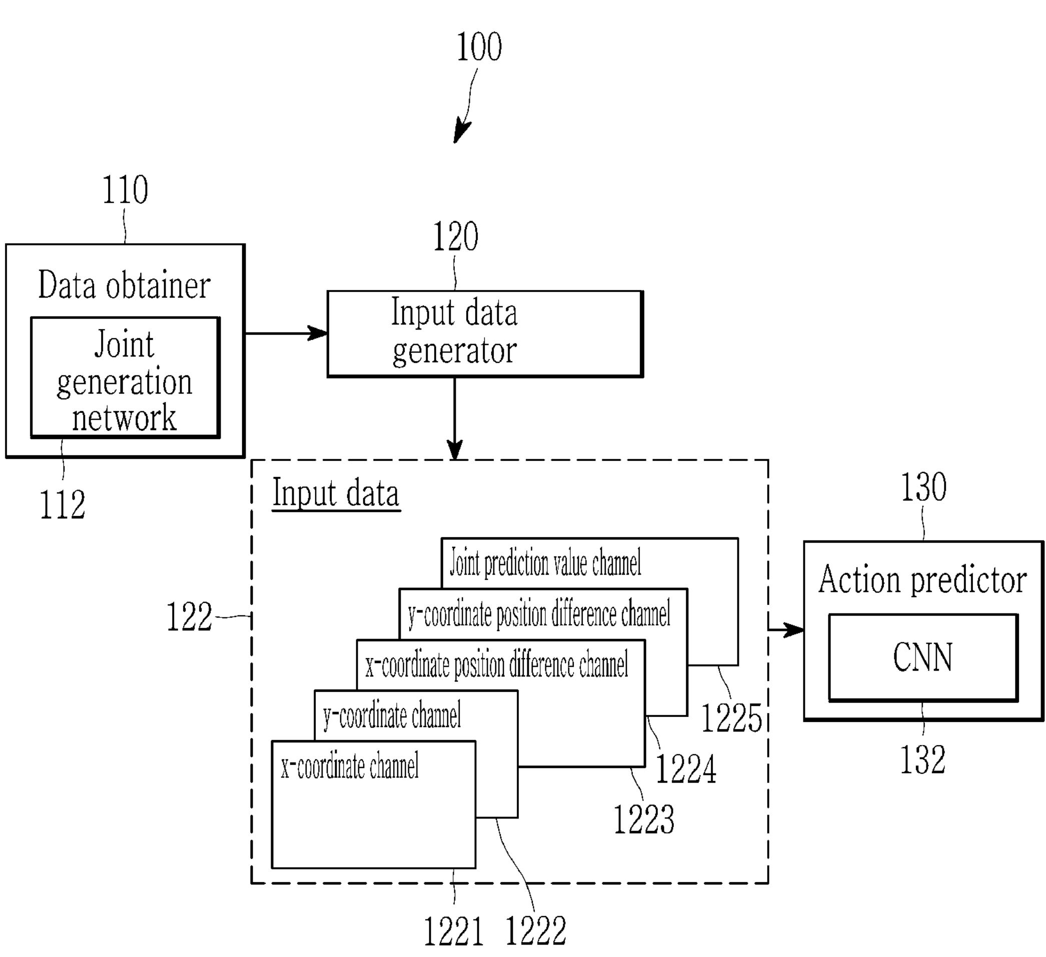
FIG. 1 is a diagram showing an action recognition apparatus according to an embodiment.

Hereinafter, embodiments of the present disclosure will be described in detail with reference to the appended drawings so that a person of ordinary skill in the art may easily implement the present disclosure. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

In addition, throughout the specification and claims, the suffixes "module", "unit", and/or "group" for components are assigned or used interchangeably in consideration of only the ease of writing the specification, and have meanings or roles that are distinguished from each other by themselves.

In the present specification and claims, terms including an ordinal number, such as first, second, etc., may be used to describe various elements, but the elements are not limited by the terms. The above terms are used only for distinguishing one element from another element. For example, without departing from the scope of the present disclosure, a first element may be referred to as a second element, and similarly, a second element may be referred to as a first element.

Throughout the specification and claims, when an element is referred to as being "connected" to another element, it should be understood that it may be directly connected to the other element, but other elements in the middle between the element and another element may exist. On the other hand, when an element is referred to as "directly connected" to another element, it should be understood that no other element exists in the middle.

In the flowchart described with reference to the drawings in the present specification, the order of operations may be changed, several operations may be merged, some operations may be divided, and specific operations may not be performed.

Furthermore, in the present specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Also, in this specification, terms such as "unit", "group", and "module" refer to a unit that processes at least one function or operation, and may be implemented as hardware or software or a combination of hardware and software.

Now, an action recognition apparatus and method according to an embodiment will be described in detail with reference to the drawings.

FIG. 1 is a diagram showing an action recognition apparatus according to an embodiment.

Referring to FIG. 1, the action recognition apparatus 100 may include a data obtainer 110, an input data generator 120, and an action predictor 130.

The data obtainer 110 may detect position value and joint prediction value of each joint from a video image input from an image acquisition device, for example, a camera.

The data obtainer 110 may detect the position value and joint prediction value of each joint from the video image using the joint generation network 112. An OpenPose, cascaded pyramid network (CPN), AlphaPose, high-resolution net (HRNet), etc. may be used as the joint generation network 112. The joint may be, for example, shoulder, knee, waist, wrist, neck, elbow, etc. The position value of each joint may include two-dimensional (2D) position coordinates (x, y) or three-dimensional position coordinates (x, y, z). The joint prediction value may represent the probability that the joint generation network 112 predicts that the joint is a specific joint (e.g., wrist).

The input data generator 120 may calculate the joint position difference using the joint position value of each image frame.

The input data generator 120 may generate one input data 122 for the entire image frame constituting the video image using the joint position value, joint position difference, and joint prediction value of each entire image frame constituting the video image. The input data 122 may be three-dimensional data expressed as (number of channels, number of image frames, number of joints).

The input data generator 120 may convert the data of each of the plurality of image frames constituting the video image for each channel into 2D image data for each channel having the form of a matrix for entire image frame constituting the video image, and may generate one input data 122 for the entire image frame constituting the video image by stacking the 2D image data for each channel.

According to an embodiment, the input data 122 may include 2D image data in each channel 1221, 1222, 1223, 1224, and 1225 for entire image frame. The 2D image data may refer to 2D data expressed as a 2D array. In FIG. 1, five channels are shown for convenience.

The 2D image data of one channel for an entire frame may have a size of t×n. t may represent the number of image frames constituting the video image. n may represent the number of joints constituting the body.

In some embodiments, the joint position value may include x-coordinates and y-coordinates. In this case, the joint position difference may include an x-coordinate position difference and a y-coordinate position difference. When the joint position value includes x-coordinates and y-coordinates, the number of channels of the input data may be 5, and the plurality of channels may include x-coordinate channel, y-coordinate channel, x-coordinate position difference channel, y-coordinate position difference channel, and joint prediction value channel. That is, as shown in FIG. 1, the input data 122 may include 2D image data of the x-coordinate channel 1221, 2D image data of the y-coordinate channel 1222, 2D image data of the x-coordinate position difference channel 1223, 2D image data of the y-coordinate position difference channel 1224, and 2D image data of the joint prediction value channel 1225. In the 2D image data of each channel 1221, 1222, 1223, 1224, and 1225, the pixel value may represent a value corresponding to the corresponding channel. For example, in the 2D image data of the joint prediction value channel 1225, the (i,j) pixel value may represent the joint prediction value of the i-th joint in the j-th image frame.

In another embodiment, the joint position value may include x-coordinates, y-coordinates, and z-coordinates. In this case, the joint position difference may include an x-coordinate position difference, a y-coordinate position difference, and a z-coordinate position difference. When the joint position value includes x-coordinates, y-coordinates, and z-coordinates, the number of channels of input data may be 7. The 7 channels may include x-coordinate channel, y-coordinate channel, z-coordinate channel, x-coordinate position difference channel, y-coordinate position difference channel, z-coordinate position difference channel, and joint prediction value channel.

The input data generator 120 may calculate the x-coordinate position difference of each joint based on the x-coordinate information of each joint. The x-coordinate position difference of each joint may be calculated as in Equation 1.

$$T_t, JDn_x = 0 \text{ (if } t = 1) \quad \text{(Equation 1)}$$

$$T_t, JDn_x = (T_{t+1}, Jn_x) - (T_t, Jn_x) \text{ (otherwise)}$$

The dimension of the input data 122 may be (5, t, n) or (7, t, n).

The input data generator 120 may calculate the y-coordinate position difference of each joint and the z-coordinate position difference of each joint in a method similar to Equation 1.

The action predictor 130 may recognize the type of action based on input data. The type of action may vary, for example, lying down, sitting, walking, running, etc. The action predictor 130 may recognize the type of action from input data using an action recognition model. In one embodiment, a convolutional neural network (CNN) 132 may be used as the action recognition model. The CNN 132 may receive input data and output a corresponding action type. The ResNet, VGGNet, etc. may be used as the CNN 132.

The CNN 132 may include at least one convolutional layer, at least one activation layer, and at least one pooling layer. The convolutional layer may receive an input image as an input, perform a convolution operation, and then output a feature map. The activation layer may normalize the output value of the convolutional layer using an activation function. The pooling layer may extract representative features by performing sampling or pooling on the output of the activation layer. At this time, the at least one convolutional layer, the at least one activation layer, and the at least one pooling layer may each be repeatedly connected. In addition, the CNN 132 may include a fully-connected layer and a softmax layer. The fully-connected layer may combine multiple features extracted through a pooling layer, and the softmax layer may normalize the output of the fully-connected layer using a softmax function. This CNN 132 may be a 2D CNN.

A three-dimensional (3D) CNN may be interpreted as an artificial neural network that extends 2D CNN by one dimension along the time axis. The 2D CNN generally receives an image as input and may provide services such as classifying image or identifying objects from the input image through spatial characteristics of the input image. The 2D CNN may not process image data containing time information. In the case of image data containing time information, the 3D CNN that performs convolution and pooling operations by considering the time component of the image data may be used.

However, as in the embodiment, one input data 122 is generated for the entire image frame constituting the video image by the input data generator 120, so the 2D CNN may receive the input data 122 and perform the operation. Therefore, a service for images containing time information may be provided using the 2D CNN. Therefore, the 2D CNN may be used as the CNN 132, and by using the 2D CNN, it is possible to realize a lighter model of the CNN 132, and the scope of application may be expanded due to the lighter model.

In addition, since the input data 122 includes 2D image data of the x-coordinate position difference channel 1223 and 2D image data of the y-coordinate position difference channel 1224, the CNN 132 may more accurately recognize the type of action by explicitly using the position difference of each joint.

Figure 2:
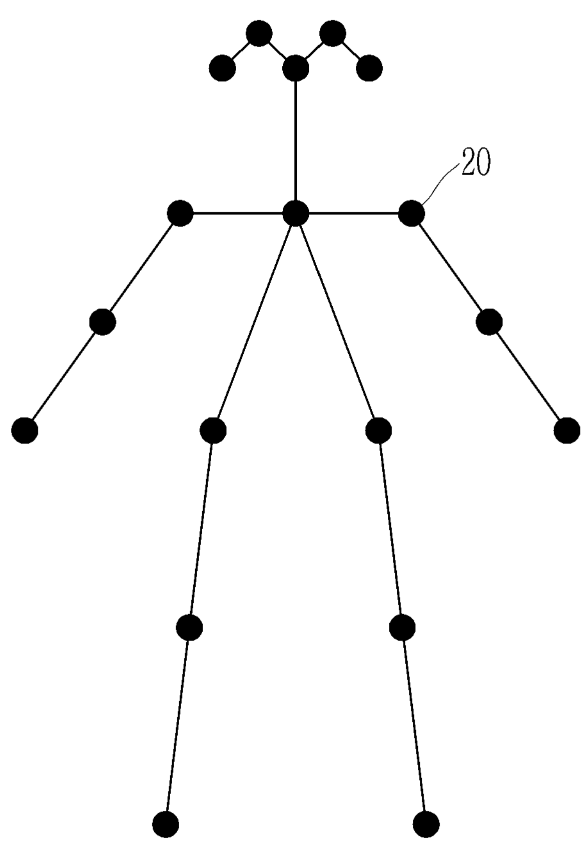
FIG. 2 is a diagram illustrating an example of body joints generated by the joint generation network shown in FIG. 1.

FIG. 2 is a diagram illustrating an example of body joints generated by the joint generation network shown in FIG. 1.

Referring to FIG. 2, the joint generation network 112 may extract an area where a person exists from an input image, may detect key points 20 in the area where a person exists, and may predict the position values of the key points 20. The key points 20 may be major joints that constitutes posture of a person.

The joint generation network 112 may output the position values and joint prediction values of the joints corresponding to the key points 20. The position values of the joints may be output as 2D position coordinates (x, y) or 3D position coordinates (x, y, z).

FIG. 3 is a diagram showing part of input data according to one embodiment.

Referring to FIG. 3, the input data generator 120 may generate 2D image data 300 of a plurality of channels for one frame using the position value and joint prediction value of each joint for one frame detected by the data obtainer 110.

The 2D image data 300 of a plurality of channels for one frame may include 2D image data of the x-coordinate channel for one image frame, 2D image data of the y-coordinate channel for one image frame, 2D image data of the x-coordinate position difference channel for one image frame, 2D image data of the y-coordinate position difference channel for one image frame, and 2D image data of the joint prediction value channel for one image frame.

The 2D image data of the x-coordinate channel for one image frame may include the x-coordinate of each joint for one image frame. JNx may represent the x-coordinate of the joint with index N. The x-coordinate of each joint for one image frame may be expressed in matrix form.

The 2D image data of the y-coordinate channel for one image frame may include the y-coordinate of each joint for one image frame. JNy may represent the y-coordinate of the joint with index N. The y-coordinate of each joint for one image frame may be expressed in matrix form.

The 2D image data of the x-coordinate position difference channel for one image frame may include the position difference of x-coordinates over time of each joint for one image frame. JDNx may represent the difference in x-coordinates over time of the joint with index N. The position difference in the x-coordinate over time of each joint for one image frame may be expressed in matrix form.

The 2D image data of the y-coordinate position difference channel for one image frame may include the y-coordinate position difference over time of each joint for one image frame. JDNy may represent the difference in y-coordinates over time of the joint with index N. The position difference in the y-coordinate of each joint over time for one image frame may be expressed in the form of a matrix.

The joint prediction value channel for one image frame may include the prediction value of each joint for one image frame. The prediction value of each joint for one image frame may be expressed in matrix form.

In FIG. 3, 9 joints are shown for convenience. That is, N may have values from 1 to 9. The index of the joint may be set in advance. For example, the index of nose may be set to 1, and the index of wrist may be set to 2. In addition, for one frame, 2D image data of the x-coordinate channel, 2D image data of the y-coordinate channel, 2D image data of the x-coordinate position difference channel, 2D image data of the y-coordinate position difference channel, and 2D image data of the joint prediction value channel are shown in the form of a 3×3 matrix.

FIG. 4 is a diagram showing part of input data according to another embodiment.

Referring to FIG. 4, the input data generator 120 may generate 2D image data of the plurality of channels for one image frame using the position value and joint prediction value of each joint for one image frame detected by the data obtainer 110.

The 2D image data 400 of the plurality of channels for one image frame may include 2D image data of the x-coordinate channel for one image frame, 2D image data of the y-coordinate channel for one image frame, and 2D image data of the z-coordinate channel for one image frame, 2D image data of the x-coordinate position difference channel for one image frame, 2D image data of the y-coordinate position difference channel for one image frame, and 2D image data of the joint prediction value channel for one image frame.

The 2D image data of the x-coordinate channel for one image frame may include the x-coordinate of each joint for one image frame. JNx may represent the x-coordinate of the joint with index N. The x-coordinate of each joint for one image frame may be expressed in matrix form.

The 2D image data of the y-coordinate channel for one image frame may include the y-coordinate of each joint for one image frame. JNy may represent the y-coordinate of the joint with index N. The y-coordinate of each joint for one image frame may be expressed in matrix form.

The 2D image data of the z-coordinate channel for one image frame may include the z-coordinate of each joint for one image frame. JNz may represent the z-coordinate of the joint with index N. The z-coordinate of each joint for one image frame may be expressed in matrix form.

The 2D image data of the x-coordinate position difference channel for one image frame may include the position difference of x-coordinates over time of each joint for one image frame. JDNx may represent the difference in x-coordinates over time of the joint with index N. The position difference in the x-coordinate over time of each joint for one image frame may be expressed in matrix form.

The 2D image data of the y-coordinate position difference channel for one image frame may include the y-coordinate position difference over time of each joint for one image frame. JDNy may represent the difference in y-coordinates over time of the joint with index N. The position difference in the y-coordinate over time of each joint for one image frame may be expressed in the form of a matrix.

The 2D image data of the z-coordinate position difference channel for one image frame may include the z-coordinate position difference over time of each joint for one image frame. JDNz may represent the difference in z-coordinates over time of the joint with index N. The position difference in the z-coordinate of each joint over time for one image frame may be expressed in the form of a matrix.

The joint prediction value channel for one image frame may include the prediction value of each joint for one image frame. The prediction value of each joint for one image frame may be expressed in matrix form.

FIG. 5 is a diagram showing an example of an x-coordinate channel for an entire image frame constituting a video image.

Referring to FIG. 5, the input data generator 120 may generate 2D image data 500 of the x-coordinate channel for the entire image frames constituting the video image using the x-coordinates of each joint for each of the entire frames constituting the video image.

The input data generator 120 may generate the 2D image data 500 of the x-coordinate channel by allocating the x-coordinate of each joint for each frame to each element of a matrix in which each of the n joints is set as a column element and each of the t frames constituting the video image is set as a row element.

That is, in the 2D image data 500 of the x-coordinate channel, the x-coordinates of the n joints for one frame may be arranged on the horizontal axis, and the x-coordinates of the joints for each of the t frames for the video image may be arranged on the vertical axis. In FIG. 5, "T1, J1*x*" may represent the x-coordinate J1*x* of the joint with index 1 in the first frame T1.

The 2D image data 500 of the x-coordinate channel generated in this way may be used as the 2D image data of the x-coordinate channel 1221 shown in FIG. 1.

The 2D image data of the y-coordinate channel for the entire frame, 2D image data of the z-coordinate channel for the entire frame, and 2D image data of the prediction value channel for the entire frame may also be generated in a similar way to the 2D image data 500 of the x-coordinate channel shown in FIG. 5.

FIG. 6 is a diagram showing an example of an x-coordinate position difference channel for an entire image frame constituting a video image.

Referring to FIG. 6, the input data generator 120 may generate 2D image data 600 of the x-coordinate position difference channel for the entire frames constituting the video image using the x-coordinate position difference of each joint for each of the entire frames constituting the video image.

The input data generator 120 may generate the 2D image data 600 of the x-coordinate position difference channel by allocating the x-coordinate position difference of each joint for each frame to each element of a matrix in which each of the n joints is set as a column element and each of the t frames constituting the video image is set as a row element. In FIG. 6, "T1, JD1*x*" may represent the x-coordinate position difference JD1*x* of the joint with index 1 in the first frame T1.

The 2D image data 600 of the x-coordinate position difference channel generated in this way may be used as the 2D image data of the x-coordinate position difference channel 1223 shown in FIG. 1.

The 2D image data of the y-coordinate position difference channel for the entire frame and 2D image data of the z-coordinate position difference channel may also be generated in a similar way to the 2D image data 600 of the x-coordinate position difference channel shown in FIG. 6.

Figure 7:
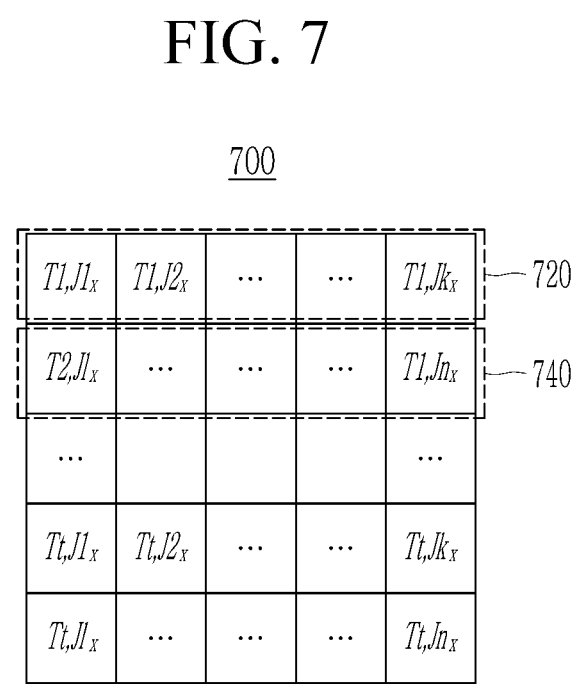
Figure 8:
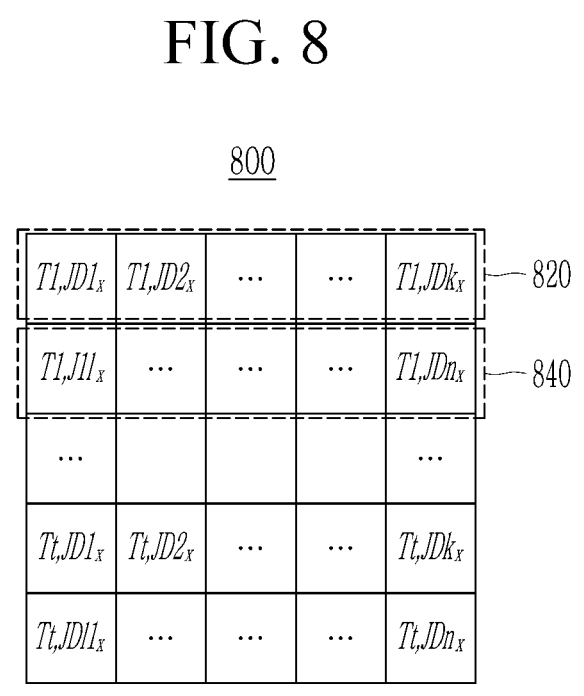

FIG. 7 is a diagram showing another example of the x-coordinate channel for the entire image frame constituting a video image, and FIG. 8 is a diagram showing another example of the x-coordinate position difference channel for the entire image frame constituting a video image.

Referring to FIG. 7, in generating 2D image data 700 of the x-coordinate channel for the entire frame, unlike 5, the input data generator 120 may divide the n joints for one frame into two areas, arrange x-coordinates of joints in one area in the elements of each column of one row 720, and arrange x-coordinates of joints in the other area in the elements of each column of the next row 740. That is, two rows 720 and 740 may represent the x-coordinates of n joints for one frame.

As an example, n joints for one frame may be divided into joints in the upper body area and joints in lower body area. As another example, the n joints for one frame may be divided into joints in the left area and joints in the right area. In addition, the input data generator 120 may arrange the x-coordinates of joints consisting of two rows for each of the t frames constituting the video image on the vertical axis. Then, the 2D image data 700 of the x-coordinate channel may include a total of 2×t rows and n columns.

The 2D image data 700 of the x-coordinate channel generated in this way may be used as the 2D image data of the x-coordinate channel 1221 shown in FIG. 1.

Referring to FIG. 8, unlike 6, the input data generator 120 may divide the n joints for one frame into two areas, and may arrange x-coordinate position differences of joints in one area in the elements of each column of one row 820, and may arrange x-coordinate position differences of joints in the other area in the elements of each column of the next row 840. That is, two rows 820 and 840 may represent the x-coordinate difference of n joints for one frame. In addition, the input data generator 120 may arrange the x-coordinate position difference of the joints consisting of two rows for each of the t frames on the vertical axis. Then, the 2D image data 800 of the x-coordinate position difference channel for the entire image frame may include a total of 2×t rows and n columns.

The 2D image data 800 of the x-coordinate position difference channel generated in this way may be used as the 2D image data of the x-coordinate position difference channel 1223 shown in FIG. 1.

In FIGS. 7 and 8, it may be k−1=n−1.

The input data generator 120 may generate 2D image data of other channels for the entire frame in the same manner.

Figure 10:
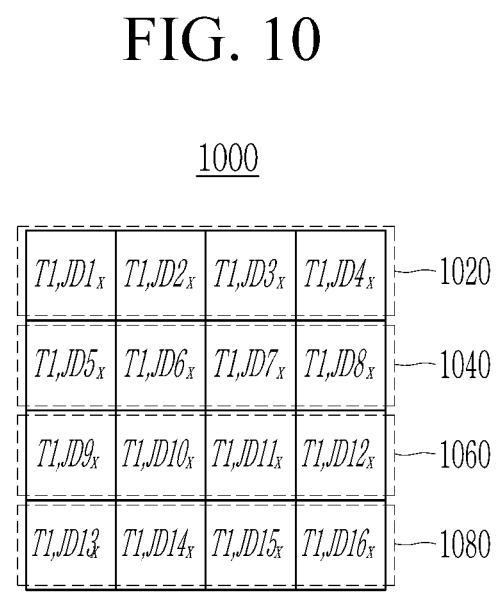

FIG. 9 is a diagram showing another example of an x-coordinate channel for one image frame, and FIG. 10 is a diagram showing another example of an x-coordinate position difference channel for one image frame.

Referring to FIGS. 9 and 10, unlike FIG. 7, the input data generator 120 may divide n joints for one frame into four areas. As an example, n joints for one frame may be divided into joints in the left upper body area, joints in right upper body area, joints in left lower body area, and joints of right lower body area. In FIGS. 9 and 10, for convenience, it is assumed that n is 16 and that there are 4 joints in the left upper body area, right upper body area, left lower body area, and right lower body area, respectively.

Referring to FIG. 9, in generating 2D image data 900 of the x-coordinate channel for the one image frame, the input data generator 120 may arrange x-coordinates of the 4 joints in the left upper body area among the 16 joints in the element of each column of one row 920, and arrange x-coordinates of 4 joints in the right upper body area among the 16 joints in the element of each column of the next row 940. Additionally, the input data generator 120 may arrange x-coordinates of the 4 joints in the left lower body area among the 16 joints in the element of each column of the next row 960, and arrange x-coordinates of the 4 joints in the right lower body area among the 16 joints in the element of each column of the next row 980. That is, four rows 920, 940, 960, and 980 may represent the x-coordinates of n joints for one frame.

Furthermore, referring to FIG. 10, in generating 2D image data 900 of the x-coordinate position difference channel for the one image frame, the input data generator 120 may arrange x-coordinate position differences of the 4 joints in the left upper body area among the 16 joints in the element of each column of one row 1020, and arrange x-coordinate position differences of the 4 joints in the right upper body area among the 16 joints in the element of each column of the next row 1040. Additionally, the input data generator 120 may arrange x-coordinate position differences in the left lower body area among the 16 joints in the element of each column of the next row 1060, and arrange x-coordinate position differences of the 4 joints in the right lower body area among the 16 joints in the element of each column of the next row 980. That is, four rows 1020, 1040, 1060, and 1080 may represent the x-coordinate position differences of n joints for one frame.

The input data generator 120 may generate 2D image data of another channel for one frame using the same or similar method as that of FIGS. 9 and 10.

FIG. 11 is a diagram showing another example of the x-coordinate position difference channel for the entire image frame constituting a video image.

Referring to FIG. 11, the input data generator 120 may generate 2D image data 1100 of the x-coordinate position difference for the entire 16 image frames constituting the video image using the x-coordinate position difference of each joint for each of the 16 image frames constituting the video image.

The 2D image data of the x-coordinate position difference channel for one frame may be generated as shown in FIG. 10. In the 2D image data 1100 of the x-coordinate position difference channel for 16 image frames, the 2D image data of the x-coordinate position difference channel for 4 image frames T1 to T4 may be arranged in one row on the horizontal axis, and in the next row, the 2D image data of the x-coordinate position difference channel for 4 image frames T5 to T8 may be arranged on the horizontal axis. In this way, 2D image data 1100 of the x-coordinate position difference channel for 16 frames can be generated.

The 2D image data 1100 of the x-coordinate position difference channel shown in FIG. 11 may be used as the 2D image data of the x-coordinate position difference channel 1223 of FIG. 1.

The input data generator 120 may also generate 2D image data of other channels for the entire image frame in the same manner.

The input data including 2D image data of the plurality of channels for the entire image frame generated in this way may be input to the CNN 132, and the CNN 132 may predict the type of action from the input data, and output the predicted type of action.

Figure 12:
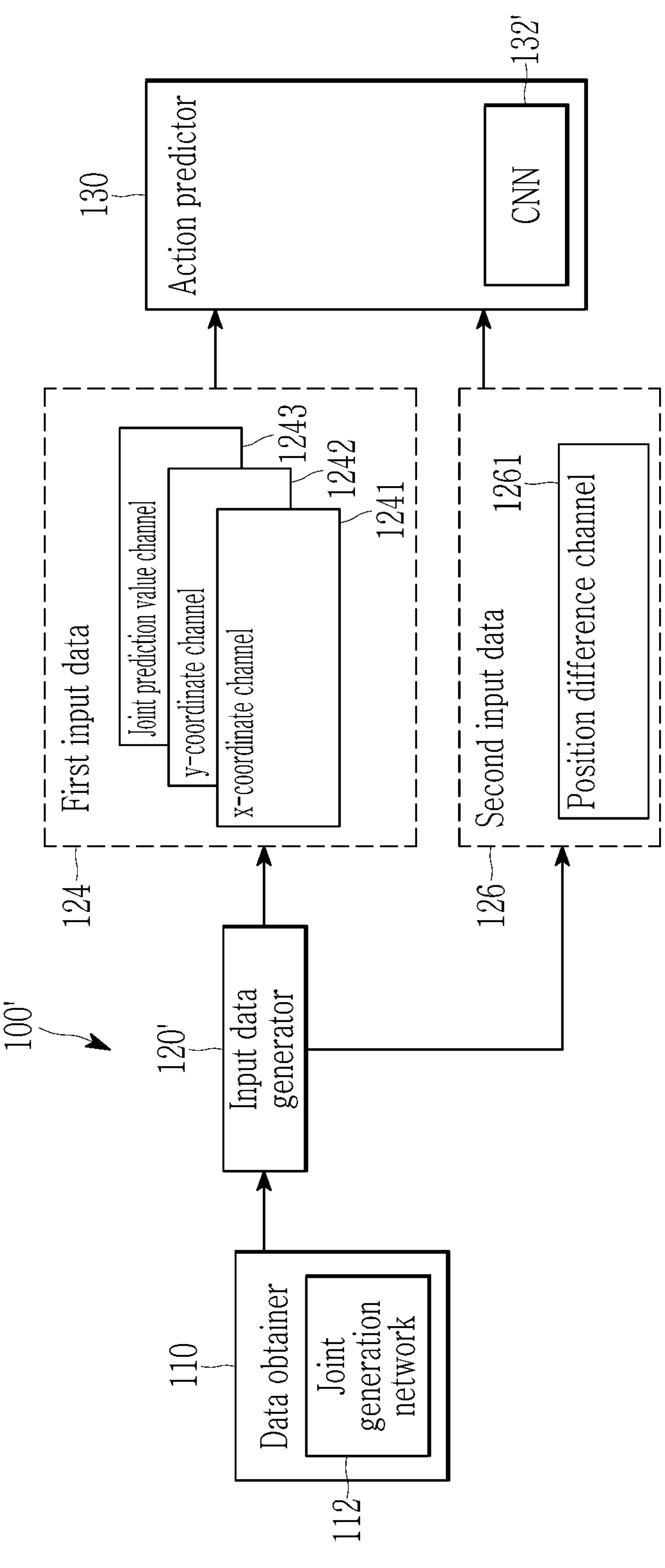
FIG. 12 is a diagram showing an action recognition apparatus according to another embodiment.

FIG. 12 is a diagram showing an action recognition apparatus according to another embodiment.

Referring to FIG. 12, unlike FIG. 1, the input data generator 120' of the action recognition apparatus 100' may generate a first input data 124 and a second input data 126 for the entire image frame constituting the video image using the joint position values, joint position differences, and joint prediction values of each image frame constituting the video image.

The input data generator 120' may calculate the x-coordinate position difference of each joint based on the x-coordinate information of each joint in each image frame. The input data generator 120' may calculate the y-coordinate position difference of each joint based on the y-coordinate information of each joint in each image frame.

In some embodiments, the input data generator 120' may calculate the z-coordinate position difference of each joint based on the z-coordinate information of each joint in each image frame.

The input data generator 120' may generate the first input data 124 including 2D image data of the x-coordinate channel 1241, 2D image data of the y-coordinate channel 1242, and 2D image data of the joint prediction value channel 1243 for the entire image frame constituting the video image.

In some embodiments, the first input data 124 may further include 2D image data (not shown in the figure) of the z-coordinate channel for the entire image frame constituting the video image.

The input data generator 120' may generates the second input data 126 including 2D image data of a position difference channel 1261 including x-coordinate position differences and y-coordinate position differences for the entire image frame constituting the video image. That is, x-coordinate position differences and y-coordinate position differences may include one channel.

In some embodiments, the 2D image data of the position difference channel 1261 may further include z-coordinate position differences for entire image frames constituting the video image.

The first input data 124 and the second input data 126 may be input to the CNN 132'.

CNN 132' may be a CNN to which an attention network is applied. The first input data 124 may be input to the first layer of the CNN, and the second input data 126 may be input to the attention network.

Figure 13:
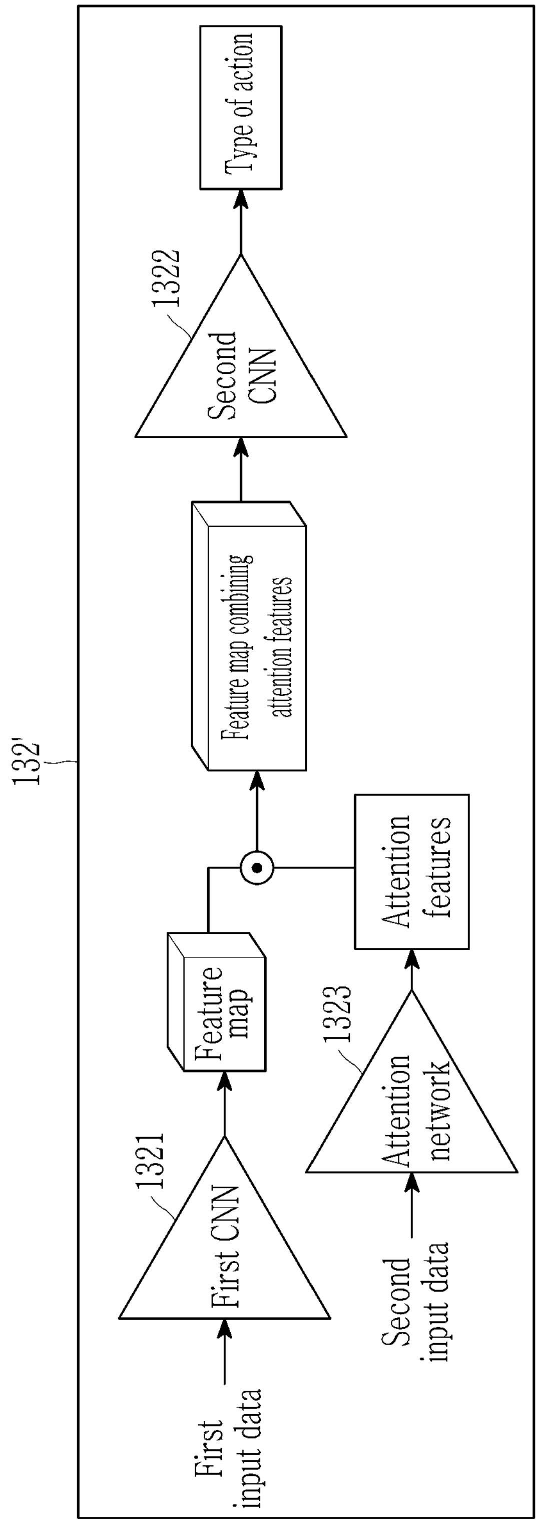
FIG. 13 is a diagram showing the CNN shown in FIG. 12.

FIG. 13 is a diagram showing the CNN shown in FIG. 12.

Referring to FIG. 13, the CNN 132' may include a first CNN 1321, a second CNN 1322, and an attention network 1323.

For example, it is assumed that the CNN 132 shown in FIG. 1 includes n layers, the first CNN 1321 of the CNN 132' may include from the first layer to the I-th layer, and the second CNN 1322 of the CNN 132' may include the (I+1)-th layer to the last layer.

The first CNN 1321 may generate a feature map from first input data. That is, the first CNN 1321 may generate a feature map for each channel for the entire image frame constituting the video image.

The attention network 1323 may generate attention features from second input data. The attention network 1323 may generate attention features for a position difference channel including x-coordinate position differences and y-coordinate position differences, or generate attention features for a position difference channel including x-coordinate position differences, y-coordinate position differences, and z-coordinate position differences. The attention network 1323 may be composed of a convolutional layer, a fully-connected layer, etc. The attention network 1323 may use a convolutional block attention module (CBAM) layer, a feature-wise linear modulation (FILM) layer, or a squeeze-and-excitation (SE) network.

The feature map for each channel output from the first CNN 1321 and the attention features generated by the attention network 1323 may be combined and a feature map combining the attention features may be input to the second CNN 1322.

The second CNN 1322 may output the type of action from the feature map for each channel that combines attention features. The second CNN 1322 may recognize the type of action while focusing more on the attention features, that is, the change in the position of each joint over time.

FIGS. 14 to 17 are diagrams showing an example of 2D image data of a position difference channel.

Figure 14:
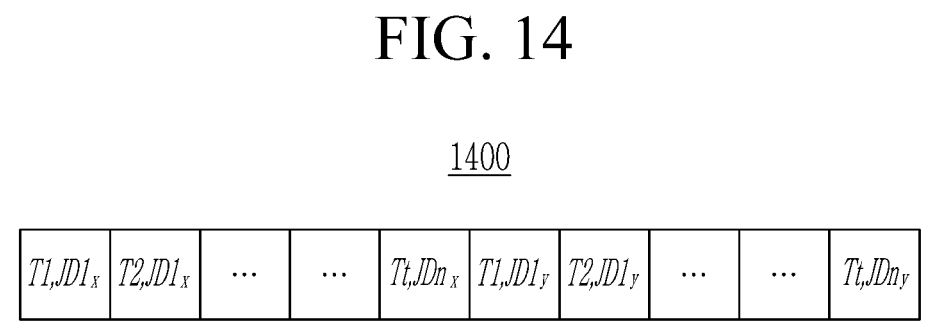

Referring to FIG. 14, the 2D image data 1400 of the position difference channel may include x-coordinate position differences and a y-coordinate position differences for the entire t image frames constituting the video image. At this time, the x-coordinate position differences of n joints and the y-coordinate position differences of n joints for t image frames constituting the video image may be arranged in one row. For example, in one row, the x-coordinate position differences of joints with index 1 from the first frame T1 to the t-th frame Tt may be arranged sequentially, and the x-coordinate position differences of joints with index 2 from the first frame T1 to the t-th frame Tt may be arranged sequentially. In this way, the x-coordinate position differences of the joints with index n from the first frame T1 to the t-th frame Tt may be arranged sequentially, and then the y-coordinate position differences of joints with index 1 from the first frame T1 to the t-th frame Tt may be arranged sequentially. In this way, the x-coordinate position differences of n joints and the y-coordinate position differences of n joints for t image frames constituting the video image may be arranged in one row. In this case, the dimension of the second input data input to the attention network 1323 may be (1, 2×t×n).

Figure 15:
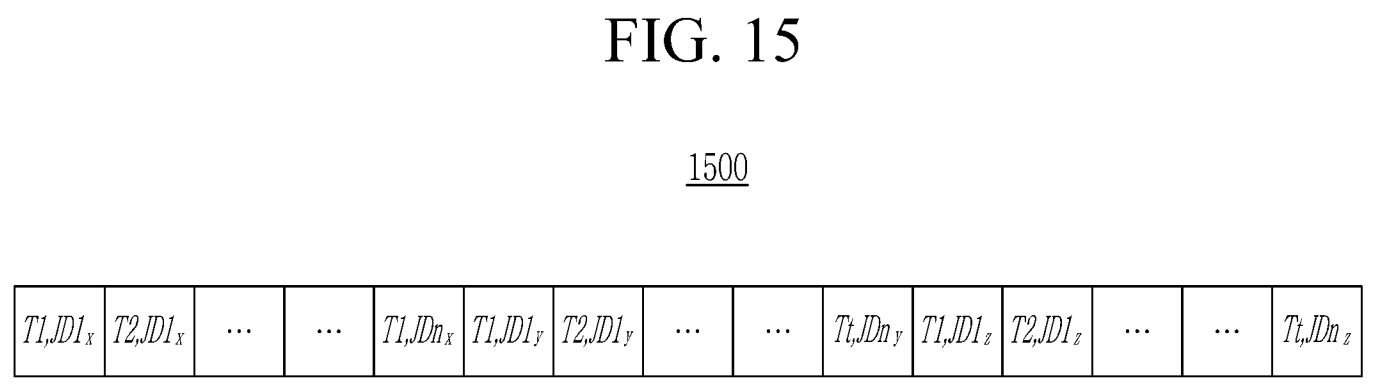

In addition, referring to FIG. 15, the 2D image data 1500 of the position difference channel may further include z-coordinate position differences for the entire t image frames constituting the video image.

In the 2D image data 1500 of the position difference channel, in one row, the z-coordinate position differences of joints with index 1 from the first frame T1 to the t-th frame Tt may be arranged sequentially, after the y-coordinate position differences of the joint with index n for the t-th frame Tt, and then the z-coordinate position differences of joints with index 2 from the first frame T1 to the t-th frame Tt may be arranged sequentially. In this way, the x-coordinate position differences of n joints for t image frames constituting the video image, the y-coordinate position differences of n joints for t image frames, and the z-coordinate position differences of n joints for t image frames may be arranged in one row. In this case, the dimension of the second input data input to the attention network 1323 may be (1, 3×t×n).

The second input data of FIGS. 14 and 15 may be used when the first layer of the attention network 1323 is a fully-connected layer.

Referring to FIG. 16, unlike FIG. 14, in the 2D image data 1600 of the position difference channel, the x-coordinate position differences and y-coordinate position differences of n joints for one image frame may be arranged in different rows.

That is, the x-coordinate position differences of n joints for the first image frame T1 may be arranged in the first row, and the y-coordinate position differences of n joints for the first frame T1 may be arranged in the second row. In the next row, the x-coordinate position differences of n joints for the second image frame T2 may be arranged. In this way, the x-coordinate position differences of n joints and the y-coordinate position differences of n joints for t image frames constituting the video image may be arranged. Then, the dimension of the second input data input to the attention network 1323 may be (2, t×n).

Referring to FIG. 17, the input data of the attention network 1323 arranges the x-coordinate position difference of each joint from the first image frame T1 to the t-th image frame in one row, the y-coordinate position difference of each joint from the first image frame T1 to the t-th image frame in one row, and the z-coordinate position difference of each joint from the first image frame T1 to the t-th image frame in one row, and then may combine them on the vertical axis. At this time, the dimension of the input data of the attention network 1323 may be (3, t×n).

The 2D image data 1700 of the position difference channel may further include z-coordinate position differences for entire t image frames constituting the video image.

Unlike FIG. 14, in the 2D image data 1700 of the position difference channel, the x-coordinate position differences, y-coordinate position differences, and z-coordinate position differences of n joints for one image frame may be arranged in different rows.

That is, the x-coordinate position differences of n joints for the first frame T1 may be arranged in the first row, and the y-coordinate position differences of n joints for the first image frame T1 may be arranged in the second row, and the z-coordinate position differences of n joints for the first image frame T1 may be arranged in the third row. In the next row, the x-coordinate position differences of n joints for the second frame T2 may be arranged. In this way, the x-coordinate position differences of n joints, the y-coordinate position differences of n joints, and the z-coordinate position differences of n joints for t image frames constituting the video image may be arranged. Then, the dimension of the second input data input to the attention network 1323 may be (3, t×n).

The second input data of FIGS. 16 and 17 may be used when the first layer of the attention network 1323 is a convolutional layer.

If the first layer of the attention network 1323 is a convolutional layer, joints may be divided according to body part as necessary, and the coordinate position difference of each joint may be arranged in the manner shown in FIG. 8 or FIG. 10.

Figure 18:
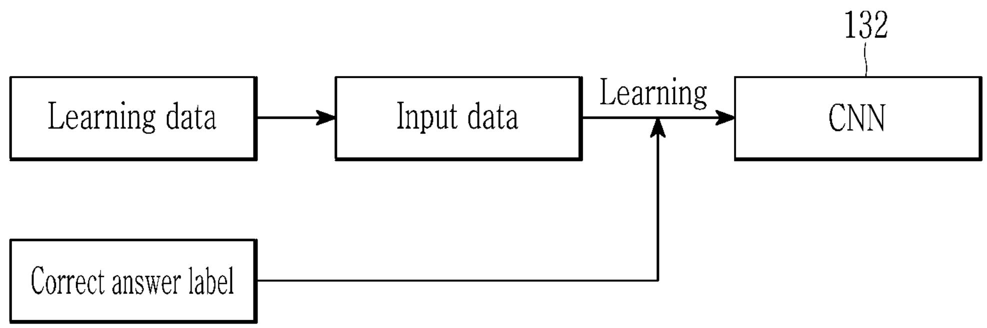
FIG. 18 is a diagram schematically explaining an example of learning process of a CNN according to an embodiment.

FIG. 18 is a diagram schematically explaining an example of learning process of a CNN according to an embodiment.

Referring to FIG. 18, the CNN 132 can be learned using input data and correct answer label obtained from each of video image data included in the learning data.

The input data may be generated by the input data generator 120 described in FIG. 1.

As shown in FIG. 1, the input data is 2D image data of the x-coordinate channel 1221 for the entire image frame constituting the video image, 2D image data of the y-coordinate channel 1222 for the entire image frame constituting the video image, 2D image data of the x-coordinate position difference channel 1223 for the entire image frame constituting the video image, 2D image data of the y-coordinate position difference channel 1224 for the entire image frame constituting the video image, and 2D image data of the joint prediction value channel 1225 for the entire image frame constituting the video image.

The input data may include 2D image data if the z-coordinate channel for the entire image frame constituting the video image, and 2D image data of the z-coordinate position difference channel for the entire image frame constituting the video image.

Accordingly, the CNN 132 may be learned by explicitly using the change in position of each joint for the entire image frame constituting the video image.

Figure 19:
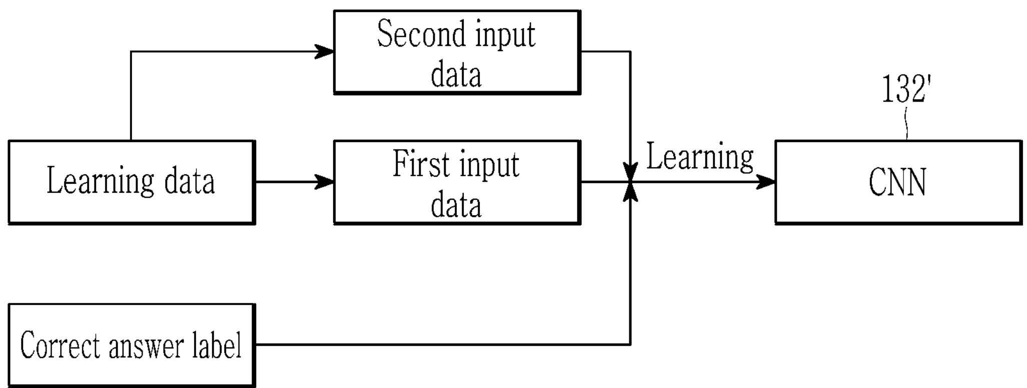
FIG. 19 is a diagram schematically explaining another example of learning process of a two-dimensional CNN according to an embodiment.

FIG. 19 is a diagram schematically explaining another example of learning process of a 2D CNN according to an embodiment.

Referring to FIG. 19, the CNN 132' may be learned using first input data, second input data, and correct answer label obtained from each of the video image data included in the learning data. The first input data may be input to the first layer of the first CNN 1321, and the second input data may be input to the first layer of the attention network 1323.

The first input data and the second input data may be generated by the input data generator 120' described in FIG. 12.

Accordingly, the CNN 132' may be learned by explicitly using the change in position of each joint for the entire image frame constituting the video image and focusing more on the change in the position of each joint over time.

The CNN 132 and CNN 132' learned in this way may more accurately recognize the type of action by receiving the position change of each joint as input data.

Figure 20:
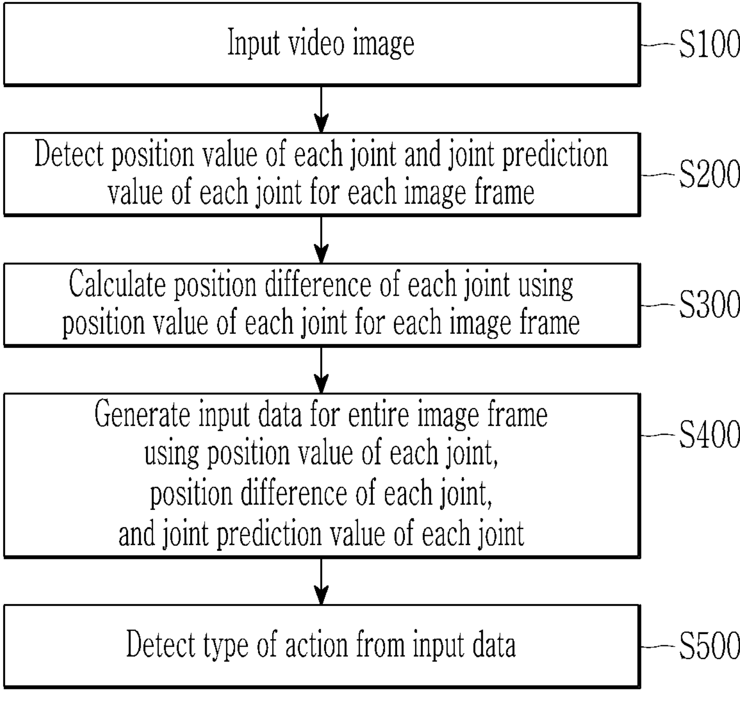
FIG. 20 is a flowchart showing an action recognition method according to an embodiment.

FIG. 20 is a flowchart showing an action recognition method according to an embodiment.

Referring to FIG. 20, when a video image corresponding to a detection target is input (S100), the action recognition apparatus may detect the position value of each joint and the joint prediction value for each joint for each of the plurality of image frames from the input image (S200).

The action recognition apparatus may calculate the position difference of each joint for each of the plurality of image frames using the position value of each joint for each of the plurality of image frames (S300).

The action recognition apparatus may generate input data for all of the image frames constituting the video image using the position value of each joint, the position difference of each joint, and the joint prediction value for each of the plurality of image frames (S400). The input data may include the position value of each joint, the position difference of each joint, and the joint prediction value for each of the plurality of image frames.

The action recognition apparatus may detect the type of action from input data (S500). The input data may be input to the CNN 132, and the CNN 132 may output an action type corresponding to the input data.

In some embodiments, the action recognition apparatus may generate first input data and second input data for entire frames constituting the video image, as shown in FIG. 12. In this case, the first input data and the second input data may be input to the CNN 132', and the CNN 132' may output action type corresponding to the first input data and the second input data.

FIG. 21 is a diagram showing an action recognition apparatus according to another embodiment.

Referring to FIG. 21, the action recognition apparatus 2100 may be represented by a computing device that implements the action recognition method described above.

The action recognition apparatus 2100 may include at least one of a processor 2110, a memory 2120, an input interface device 2130, an output interface device 2140, a storage device 2150, and a network interface device 2160. Each of the components may be connected by a common bus 2170 to communicate with each other. In addition, each of the components may be connected through an individual interface or a separate bus centering on the processor 2110 instead of the common bus 2170.

The processor 2110 may be implemented as various types such as an application processor (AP), a central processing unit (CPU), a graphics processing unit (GPU), etc., and may be any semiconductor device that executes a command stored in the memory 2120 or the storage device 2150. The processor 2110 may execute program commands stored in at least one of the memory 2120 and the storage device 2150. This processor 2110 may store program commands for implementing at least some functions of the data obtainer 110, the input data generator 120 or 120', and the action predictor 130 shown in FIG. 1 or 12 in the memory 2120, and may control the various components to perform the operation described above. In some embodiments, the data obtainer 110, input data generator 120 or 120', and action predictor 130 may each be implemented as a processor.

The memory 2120 and storage device 2150 may include various types of volatile or non-volatile storage media. For example, the memory 2120 may include read-only memory (ROM) 2121 and random access memory (RAM) 2122. The memory 2120 may be located inside or outside the processor 2110, and the memory 2120 may be connected to the processor 2110 through various known means.

The input interface device 2130 may be configured to provide input data to the processor 2110. In some embodiments, the input data may be video image that is a detection target.

The output interface device 2140 may be configured to output data from the processor 2110. In some embodiments, the output data may be the type of action predicted from the input data.

The network interface device 2160 may transmit or receive signals to and from external devices through a wired network or wireless network.

According to an embodiment, the accuracy of action recognition may be improved by using an action recognition model that explicitly learns the position change of each joint and using the position change of each joint as input data of the action recognition model.

In addition, since a 2D CNN may be used as an action recognition model, it is possible to make the model lighter, and it can be applied to small devices or small systems.

At least some of the action recognition method according to the present disclosure may be implemented as a program or software executed in a computing device, and the program or software may be stored in a computer-readable medium.

In addition, at least some of the action recognition method according to the present disclosure may be implemented as hardware capable of being electrically connected to the computing device.

Although the embodiments of the present disclosure have been described in detail above, the scope of the present disclosure is not limited thereto, and various modifications and improvements of those skilled in the art using the basic concepts of the present disclosure defined in the following claims are also included in the present disclosure.

What is claimed is:

1. An action recognition method comprising:

receiving, by an action recognition apparatus operated by a processor, a video image;

detecting, by a data obtainer, both a position value and a joint prediction value of each joint among a plurality of joints for each image frame among a plurality of image frames constituting the video image;

calculating, by an input data generator, a position difference of the each joint for the each image frame;

generating, by the input data generator, input data including the position value, the joint prediction value, and the position difference of the each joint for the each image frame; and detecting, by an action predictor including an action recognition model, a type of action by inputting the input data into the action recognition model, wherein the action recognition model is a convolutional neural network (CNN), wherein the input data includes a first input data and a second input data, wherein the first input data includes:

2D image data of a first channel including an x-coordinate of the each joint for the plurality of image frames;

2D image data of a second channel including a y-coordinate of the each joint for the plurality of image frames; and 2D image data of a third channel including the joint prediction value of the each joint for the plurality of image frames, and wherein the second input data includes:

2D image data of a fourth channel including an x-coordinate position difference of the each joint for the plurality of image frames and a y-coordinate position difference of the each joint for the plurality of image frames.

2. The action recognition method of claim 1, wherein the input data further includes two-dimensional (2D) image data of the first channel including the position value of the each joint for the plurality of image frames;

2D image data of the second channel including the position difference of the each joint for the plurality of image frames; and 2D image data of the third channel including the joint prediction value of the each joint for the plurality of image frames.

3. The action recognition method of claim 2, wherein the position value includes an x-coordinate and a y-coordinate, and the position difference includes an x-coordinate position difference and a y-coordinate position difference.

4. The action recognition method of claim 3, wherein the 2D image data of the first channel includes:

2D image data of an x-coordinate channel including an x-coordinate of the each joint for the plurality of image frames; and 2D image data of a y-coordinate channel including a y-coordinate of the each joint for the plurality of image frames, the 2D image data of the second channel includes:

2D image data of a x-coordinate position difference channel including an x-coordinate position difference of the each joint for the plurality of image frames; and 2D image data of a y-coordinate position difference channel including a y-coordinate position difference of the each joint for the plurality of image frames.

5. The action recognition method of claim 2, wherein the position value includes an x-coordinate, a y-coordinate, and a z-coordinate, and the position difference includes an x-coordinate position difference, a y-coordinate position difference, and a z-coordinate position difference.

6. The action recognition method of claim 5, wherein the 2D image data of the first channel includes;

2D image data of an x-coordinate channel including an x-coordinate of the each joint for the plurality of image frames;

2D image data of a y-coordinate channel including a y-coordinate of the each joint for the plurality of image frames; and 2D image data of a z-coordinate channel including a z-coordinate of the each joint for the plurality of image frames, the 2D image data of the second channel includes:

2D image data of a x-coordinate position difference channel including an x-coordinate position difference of the each joint for the plurality of image frames;

2D image data of a y-coordinate position difference channel including a y-coordinate position difference of the each joint for the plurality of image frames; and 2D image data of a z-coordinate position difference channel including a z-coordinate position difference of the each joint for the plurality of image frames.

7. The action recognition method of claim 1, wherein the first input data includes the position value and the joint prediction value of the each joint for the plurality of image frames; and the second input data includes the position difference of the each joint for the plurality of image frames, the action recognition model is the convolutional neural network (CNN) with an attention network applied, and the action recognition method further includes:

inputting, by the action recognition apparatus, the first input data to a first layer of the CNN, and inputting, by the action recognition apparatus, the second input data to the attention network.

8. The action recognition method of claim 7, wherein the position value includes an x-coordinate and a y-coordinate, and the position difference includes an x-coordinate difference and a y-coordinate difference.

9. The action recognition method of claim 7, wherein the position value includes an x-coordinate, a y-coordinate, and a z-coordinate, and the position difference includes an x-coordinate position difference, a y-coordinate position difference, and a z-coordinate position difference.

10. The action recognition method of claim 9, wherein the first input data further includes;

2D image data of a third channel including a z-coordinate of the each joint for the plurality of image frames; and the second input data further includes:

2D image data of the fourth channel further including a z-coordinate position difference of the each joint for the plurality of image frames.

11. The action recognition method of claim 1, further comprising learning the action recognition model by utilizing the position value, the joint prediction value, and the position difference of the each joint for the each image frame obtained from each of a plurality of learning video images along with a correct answer label as learning data.

12. An action recognition apparatus that recognizes actions from an input video image, the action recognition apparatus operated by a processor and comprising:

a data obtainer configured to detect both a position value and a joint prediction value of each joint among a plurality of joints for each image frame among a plurality of image frames constituting the input video image;

an input data generator configured to calculate a position difference of the each joint for the each image frame and generate an input data including the position value, the joint prediction value, and the position difference of the each joint for the each image frame; and an action predictor configured to include an action recognition model and recognize a type of action based on results output by inputting the input data into the action recognition model, wherein the action recognition model is a convolutional neural network (CNN), wherein the input data includes a first input data and a second input data, wherein the first input data includes:

2D image data of a first channel including an x-coordinate of the each joint for the plurality of image frames;

2D image data of a second channel including a y-coordinate of the each joint for the plurality of image frames; and 2D image data of a third channel including the joint prediction value of the each joint for the plurality of image frames, and wherein the second input data includes:

2D image data of a fourth channel including an x-coordinate position difference of the each joint for the plurality of image frames and a y-coordinate position difference of the each joint for the plurality of image frames.

13. The action recognition apparatus of claim 12, wherein the position value includes an x-coordinate and a y-coordinate, the position difference includes an x-coordinate difference and a y-coordinate difference, and the input data includes:

2D image data of the third channel including an x-coordinate position difference of the each joint for the each image frame for the plurality of image frames; and 2D image data of a fifth channel including the joint prediction value of the each joint for the plurality of image frames.

14. The action recognition apparatus of claim 13, wherein the position value further includes a z-coordinate, the position difference further includes a z-coordinate position difference, the input data further includes:

2D image data of a sixth channel including a z-coordinate of the each joint for the plurality of image frames; and 2D image data of a seventh channel including a z-coordinate position difference of the each joint for the plurality of image frames.

15. The action recognition apparatus of claim 12, wherein the first input data includes the position value and the joint prediction value of the each joint for the plurality of image frames; and the second input data includes the position difference of the each joint for the plurality of image frames, the action recognition model is the convolutional neural network (CNN) with an attention network applied, the action recognition apparatus is configured to input the first input data to a first layer of the CNN, and the action recognition apparatus is configured to input the second input data to the attention network.

16. The action recognition apparatus of claim 15, wherein the position value includes an x-coordinate and a y-coordinate, the position difference includes an x-coordinate difference and a y-coordinate difference.

17. The action recognition apparatus of claim 16, wherein the position value further includes a z-coordinate, the position difference further includes a z-coordinate position difference, the first input data further includes 2D image data of a fifth channel including a z-coordinate of the each joint for the plurality of image frames, and the 2D image data of the fourth channel further includes a z-coordinate position difference of the each joint for the plurality of image frames.

* * * * *